Oct. 19, 1926.

D. J. VAN MARLE

DRUM DRIER

Filed Jan. 17, 1925   2 Sheets-Sheet 1

INVENTOR
Dirk Jacobus Van Marle
BY
ATTORNEY

Oct. 19, 1926.

D. J. VAN MARLE 1,603,886

DRUM DRIER

Filed Jan. 17, 1925

INVENTOR
Dirk Jacobus Van Marle
BY
ATTORNEY

Patented Oct. 19, 1926.

1,603,886

UNITED STATES PATENT OFFICE.

DIRK JACOBUS VAN MARLE, OF BUFFALO, NEW YORK, ASSIGNOR TO BUFFALO FOUNDRY & MACHINE COMPANY, INC., OF BUFFALO, NEW YORK, A CORPORATION OF NEW YORK.

DRUM DRIER.

Application filed January 17, 1925. Serial No. 3,022.

My invention relates in general to drum drying apparatus and particularly to that kind of apparatus in which an overflow pan is used to feed the material to the drum.

The principal object of my invention has been to provide a drier having an overflow pan in which there shall be no possible objectionable building up or deposit of solid matters of material having solid particles in suspension.

Another object has been to provide a feeding pan which shall apply a coating of material to the drum in such a manner that the above noted objection will be overcome.

Furthermore my invention provides for the uniform distribution of the material as it is fed to the feeding pan.

Moreover I provide for constant flow of materials in suspension as they are fed to the feeding pan, whereby accumulation of the solid materials will be prevented.

The above objects and advantages have been accomplished by the device shown in the accompanying drawings, of which:

Figure 1:
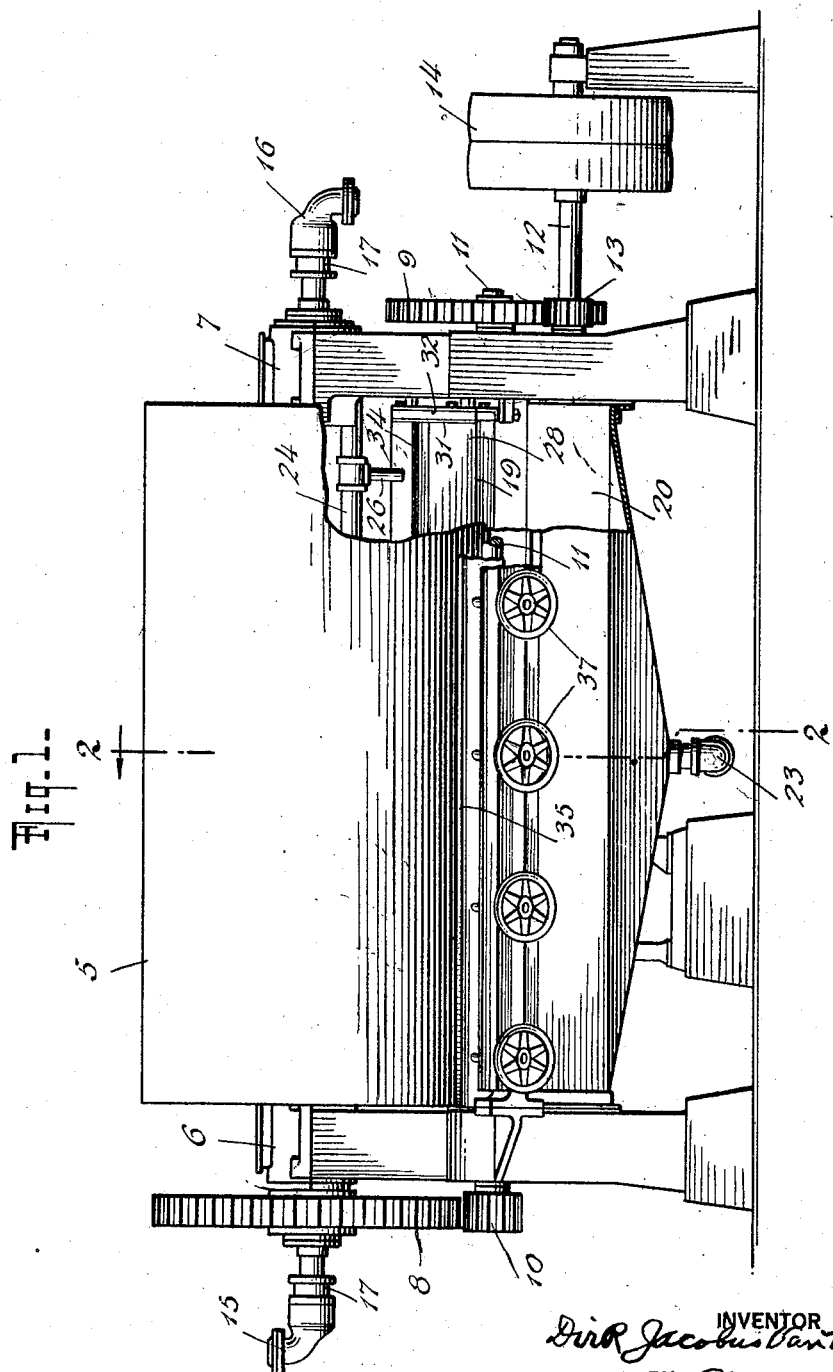
Fig. 1 is a front elevation of an atmospheric drum drier embodying my invention, parts thereof being broken away.

My device comprises a drum 5 which is rotatably mounted in suitable trunnion bearings 6 and 7. The drum is rotated by means of a gear 8 mounted upon the drum shaft. Back gears 9 and 10 are mounted upon a shaft 11, suitably mounted in the bearings 6 and 7. A jack shaft 12, having a pinion 13 is mounted at one side of the machine and the pinion 13 engages with the back gear 9. The jack shaft 12 carries pulleys 14, whereby the drum may be driven through the gearing just above mentioned.

The drum is suitably heated, preferably with steam, which passes into and out of the drum through fittings 15 and 16. Each of these fittings is provided with a suitable stuffing box 17.

Arranged at the back of the device is an overflow supply tank 20 above which is mounted the feeding pan 21. The material being dried is continuously circulated by means of a circulating pump 22. The suction side of this pump is connected to the bottom of the overflow tank 20 by means of a pipe 23. The discharge side of the pump 22 is connected with a distributing manifold 24 by means of a pipe 25. Connected with the distributing manifold is a plurality of distributing pipes 26.

The feeding pan 21 is disposed above the overflow tank 20, and is preferably secured thereto by means of flexible clips or supports 27. The feeding pan is inclined as shown in the drawings, and the bottom 28 thereof is arranged at a substantial tangent to the periphery of the drum. The bottom has its inner edge 29 disposed in spaced relation with the periphery of the drum 5 and an aperture 19 between the pan and the drum is thereby provided. The pan is provided with a back wall 30 and with side walls 31. Adjacent the side walls 31 are strips 32 preferably of hard wood which bear against the drum and effectively close the pan at this point against the leakage of the fluids being handled. Adjusting screws 33 preferably carried by the housing of the drier are provided whereby the aperture 19 may be regulated.

The distributing pipes 26 extend into the pan and are preferably arranged immediately in front of the back wall thereof. In front of the pipes 26 is arranged an inclined baffle plate 34 whereby the flow of material coming from the distributing pipes 26 will be more uniformly and evenly distributed across the length of the pan and through the aperture 19. So as to prevent the accumulation of solid matters in front of this baffle plate, it is raised slightly from the bottom 28 of the pan, thus allowing a flow of material under the baffle plate which will prevent the accumulation of solid particles contained in the liquid being treated.

Figure 2:
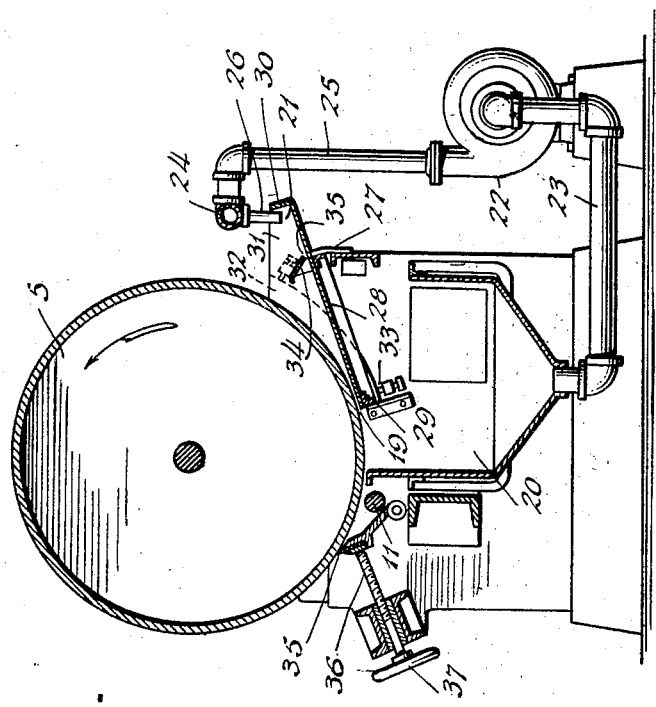
Fig. 2 is an end sectional elevation of the device taken on line 2—2 of Fig. 1.

The drum 5 rotates in the direction shown by the arrow in Fig. 2, and a scraper knife 35 is arranged beneath the drum in front of the overflow tank 20. This knife is adjusted by means of screws 36, having hand wheels 37.

From the foregoing, it will be obvious that the liquid being treated will be pumped from the overflow tank 20 and be conducted by the pipes 23 and 25 to the distributing manifold 24 where it will flow into the pan 21. As the fluid flows from the distributing pipes 26, it will strike the baffle plate 34 which acts as a dam or weir thus causing an even flow of material throughout the length of the pan. The liquid material flowing over this baffle plate flows down the pan to the drum and flows continuously through the aperture 19 provided between the edge of the pan and the outer periphery of the drum. As the material flows through the aperture 19, the drum 5 takes up a coating of wet material which is dried in less than one complete revolution and which is removed from the outer surface of the drum by means of the scraper knife 35.

My device is particularly adaptable to the handling of lead and calcium arsenates, but may, of course, be used advantageously for the treatment of liquids of any kind.

Obviously some modifications of the details herein shown and described may be made without departing from the spirit of my invention or the scope of the appended claims; and I do not, therefore, wish to be limited to the exact embodiment herein shown and described.

Having thus described my invention, what I claim is:

1. A device of the character described comprising a rotatable drum, a supply tank arranged below the drum, and an inclined feeding pan located above the supply tank and having its bottom surface arranged tangentially to the periphery of the drum for feeding liquid in a direction opposite to the direction of rotation of the drum, the inner edge of the feeding pan being in spaced relation with the periphery of the drum, whereby fluid in excess of that adhering to the surface of the drum will pass through the space between the edge of the pan and the surface of the drum.

2. A device of the character described comprising a rotatable drum, a supply tank arranged below the drum, and an inclined feeding pan located above the supply tank and having its bottom surface arranged tangentially to the periphery of the drum for feeding liquid in a direction opposite to the direction of rotation of the drum, and means for supplyng fluids to the feeding pan, whereby fluid in excess of that adhering to the surface of the drum will pass through the space between the edge of the pan and the surface of the drum.

3. A device of the character described comprising a rotatable drum, a supply tank arranged below the drum, and an inclined feeding pan located above the supply tank and having its bottom surface arranged tangentially to the periphery of the drum for feeding liquid in a direction opposite to the direction of rotation of the drum, the inner edge of the feeding pan being in spaced relation with the periphery of the drum, and means for supplying fluids to the feeding pan, whereby fluid in excess of that adhering to the surface of the drum will pass through the space between the edge of the pan and the surface of the drum.

4. A device of the character described comprising a rotatable drum, a supply tank arranged below the drum, and an inclined feeding pan located above the supply tank and having its bottom surface arranged tangentially to the periphery of the drum for feeding liquid in a direction opposite to the direction of rotation of the drum, means for supplying fluids to the feeding pan, and means carried by the pan for distributing the fluid supply, whereby fluid in excess of that adhering to the surface of the drum will pass through the space between the edge of the pan and the surface of the drum.

5. A device of the character described comprising a rotatable drum, a supply tank arranged below the drum, a feeding pan located above the supply tank and having its bottom surface arranged tangentially to the periphery of the drum for feeding liquid in a direction opposite to the direction of rotation of the drum, said pan having end walls and a side wall at the forward side of the pan, the bottom of the pan being disposed in an inclined position, and the inner edge of the pan being in spaced relation with the drum so that a fluid aperture is formed, whereby fluid in excess of that adhering to the surface of the drum will pass through the space between the edge of the pan and the surface of the drum.

6. A device of the character described comprising a rotatable drum, a supply tank arranged below the drum, and an inclined feeding pan located above the supply tank and having its bottom surface arranged tangentially to the periphery of the drum for feeding liquid in a direction opposite to the direction of rotation of the drum, a fluid supply manifold arranged over the feeding pan and a baffle plate arranged in front of the supply manifold, whereby the fluid will be uniformly distributed over the bottom of the feeding pan and be supplied in excess of that adhering to the surface of the drum.

7. A device of the character described comprising a rotatable drum, a supply tank arranged below the drum, and an inclined feeding pan located above the supply tank and having its bottom surface arranged tangentially to the periphery of the drum for feeding liquid in a direction opposite to the direction of rotation of the drum, a fluid supply manifold arranged over the feeding pan and a baffle plate arranged in front of the supply manifold, the baffle plate being arranged a slight distance above the bottom of the feeding pan, whereby the accumulation of solid particles contained in the fluid will be prevented, and fluid in excess of that adhering to the surface of the drum will pass through the space between the edge of the pan and the surface of the drum.

In testimony whereof, I have hereunto signed my name.

DIRK JACOBUS VAN MARLE.